United States Patent [19]

Moritani et al.

[11] Patent Number: 4,918,152
[45] Date of Patent: Apr. 17, 1990

[54] PROCESS FOR THE PRODUCTION OF FORMED ARTICLE OF AROMATIC VINYL RESIN

[75] Inventors: Masahiko Moritani; Takanori Fujita; Masahiro Niwano; Kazuhiro Yokoo, all of Niihama, Japan

[73] Assignee: Sumitomo Chemical Company, Limited, Osaka, Japan

[21] Appl. No.: 203,918

[22] Filed: Jun. 8, 1988

[30] Foreign Application Priority Data

Jun. 12, 1987 [JP] Japan .................... 62-147353
Apr. 8, 1988 [JP] Japan .................... 63-087548

[51] Int. Cl.⁴ .................... C08F 22/40
[52] U.S. Cl. .................... 526/262
[58] Field of Search .................... 526/262

[56] References Cited

U.S. PATENT DOCUMENTS

| | | | |
|---|---|---|---|
| 4,508,883 | 4/1985 | Younes . | |
| 4,607,081 | 8/1986 | Younes .................... | 525/186 |
| 4,683,084 | 7/1987 | Younes .................... | 525/186 |
| 4,683,275 | 7/1987 | Kato et al. . | |

FOREIGN PATENT DOCUMENTS

| | | |
|---|---|---|
| 0204548 | 12/1986 | European Pat. Off. . |
| 8830507 | 11/1988 | European Pat. Off. . |
| 61-166807 | 7/1986 | Japan . |
| 2010866 | 7/1979 | United Kingdom . |

OTHER PUBLICATIONS

Sorenson et al., Preparative Methods of Polymer Chemistry; Interscience Publishers, Inc., New York (1961), p. 161, Item 85.
Abstract XRAM Acc. No. C87-008201.

*Primary Examiner*—Joseph L. Schofer
*Assistant Examiner*—Alex H. Walker

[57] ABSTRACT

A process for the production of formed articles of aromatic vinyl resin having a small birefringence and a high refractive index by a cast polymerization process rapidly and with high productivity, wherein the formed articles of aromatic vinyl resin are light and useful for the production of various optical elements such as lenses and prisms.

21 Claims, No Drawings

PROCESS FOR THE PRODUCTION OF FORMED ARTICLE OF AROMATIC VINYL RESIN

This invention relates to a process for the production of a formed article of an aromatic vinyl resin. More particularly, it relates to a process for the production of a light formed article (e.g. various lenses, prisms, etc.) of a resin having a small birefringence and a high refractive index by a cast polymerization process rapidly and with high productivity.

Prior Art

Optical elements such as lenses and prisms have hitherto been mainly prepared from glass, but glass has disadvantages in that it is heavy and easily broken, and hence, there is recently a remarkable tendency to use plastics instead of glass.

There are known clear plastic materials such as polymethyl methacrylate, polydiethylene glycol bisallylcarbonate (a tradename: CR 39), but these plastic materials are still disadvantageous in that they have a lower refractive index than glass while they are excellent in clearness and lightness.

It is also known that resins having high refractive index can be formed into lenses, etc. having a very thin thickness, which is advantageous in that the article can be made compact. The articles are also advantageous in spherical aberration, etc. Accordingly, recent investigators have intensively studied on the resins having a high refractive index.

A repesentative example of the known resins having a high refractive index is polystyrene (refractive index=1.59). However, even in view of the high refractive index, the polystyrene is not easily formed into an optical element having excellent optical properties by an injection process molding.

On the other hand, according to the cast polymerization process which is usually applied to polymethyl methacrylate and polydiethylene glycol bisallylcarbonate resin, there can be produced an optical element having less birefringence. However, this polymerization process can merely be applied to a monomer such as methyl methacrylate which can be polymerized with high polymerization speed, or to a monomer such as diethylene glycol bisallylcarbonate which is accompanied with a crosslinking reaction during the polymerization thereof, but is not easily applied to an aromatic vinyl monomer such as styrene which is polymerized at a lower polymerization speed. Accordingly, this polymerization process has scarcely been used for such aromatic vinyl monomers.

It is disclosed in L. E. Coleman et al, Journal of Polymer Science, Vol. 38, 241, 1959 that an aromatic vinyl monomer (e.g. styrene, etc.) and a maleimide monomer have an alternating copolymerizability of 1:1.

It is also reported in Japnese Patent First Publication (Kokai) Nos. 93091/1979 and 162616/1983 that a copolymer of an aromatic vinyl monomer and a maleimide monomer is produced by reacting them with the addition of the maleimide monomer intermittently or continuously to obtain a copolymer having homogeneous component.

Japanese Patent First Publication (Kokai) No. 166807/1986 discloses a process for the production of a copolymer of an aromatic vinyl monomer, a maleimide and an unsaturated dicarboxylic anhydride which is used as a matrix material for glass fiber-reinforced conjugate products. Japanese Patent First Publication (Kokai) No. 207910/1984 discloses a copolymer of bromostyrene and bromophenylmaleimide which is used as a fire retardant additive for thermoplastic resins. Japanese Patent First Publication (Kokai) No. 171708/1986 discloses a copolymer of an aromatic vinyl monomer and a maleimide as well as methyl methacrylate which is used as a resin for optical elements. Japanese Patent First Publication (Kokai) No. 278509/1986 discloses a copolymer of an aromatic vinyl monomer and a maleimide which is used as a resin for optical disc substrates.

SUMMARY DESCRIPTION F THE INVENTION

An object of the invention is to provide a process for the production of a formed article of a resin having a small birefringence and high refractive index. Another object of the invention is to provide the formed article by rapid polymerization of an aromatic vinyl monomer which originally has a low polymerization speed. These and other objects and advantages of the invention will be apparent to those skilled in the art from the following description.

DETAILED DESCRIPTION OF THE INVENTION

This invention provides a process for the production of a formed article of an aromatic vinyl resin by a cast polymerization process which comprises copolymerizing an aromatic vinyl monomer with a maleimide monomer in an amount of 0.1 to 1.5 mole per 1 mole of the aromatic vinyl monomer and a polyfunctional monomer of 1 to 30% by weight based on the weight of the whole monomer mixture in the presence of a radical polymerization initiator.

The aromatic vinyl monomer used in this invention includes compounds having a carbon-carbon double bond which binds directly to the armoatic ring which are effective for giving the resulting resin the desired high refractive index.

Suitable examples of the aromatic vinyl monomer are styrenes (e.g. styrene, $\alpha$-methylstyrene, o-methylstyrene, m-methylstyrene, p-methylstyrene, monomethoxystyrene, monochlorostyrene, dichlorostyrene, trichlorostyrene, monobromostyrene, dibromostyrene, tribromostyrene, iodostyrene, p-(trimethylsilyloxy)styrene, etc.); polycyclic hydrocarbon aromatic vinyl compounds (e.g. vinylnaphthalene, vinylanthracene, etc.); heterocyclic vinyl compounds (e.g. N-vinylcarbazole, vinylfuran, vinylpyridine, etc.); and the like. Among them, styrenes are preferable in view of the easier handling and easier purification. These aromatic vinyl monomers may be used alone or in combination of two or more thereof.

The aromatic vinyl monomer is copolymerized in an amount of 35 to 95% by weight, preferably 45 to 90% by weight, based on the weight of the whole monomer mixtures.

The maleimide monomer is used for the purpose of promoting the polymerization of the aromatic vinyl monomer by use together with the aromatic vinyl monomer.

Suitable examples of the maleimide monomer are maleimide, aliphatic monomaleimides (e.g. N-methylmaleimide, N-ethylmaleimide, N-isopropylmaleimide, N-butylmaleimide, N-laurylmaleimide, etc.), alicyclic monomaleimides (e.g. N-cyclohexylmaleimide, N-cyclopentylmaleimide, etc.), aromatic monomaleimides (e.g. N-phenylmaleimide, N-(2-methylphenyl)maleimide, N-(4-methylphenyl)maleimide, N-(2-chlorophenyl)maleimide, N-(2-methoxyphenyl)maleimide, N-xylylmaleimide, N-(2,4,6-trichlorophenyl)maleimide, etc.), bismaleimides having no aromatic ring (e.g. N,N'-sulfonbismaleimide, N,N'-etherbismaleimide, etc.), aromatic ring bismaleimides (e.g. m-tolylenebismaleimide, N,N'-m-phenylenebismaleimide, N,N'-diphenylmethanebismaleimide, etc.), and the like. Among these maleimides, aromatic monomaleimides and alicyclic monomaleimides are preferable in view of the excellent solubility to other monomers, giving high refractive index to the resin, and high polymerization speed. Particularly, 2-substituted phenylmaleimides such as N-(2-chlorophenyl)mleimide, N-(2-methoxyphenyl)maleimide, etc. and alicyclic monomaleimides are more preferable in view of no coloring of resin. These maleimide monomers may be used alone or in combination of two or more thereof.

The maleimide monomers are used in an amount of 0.1 to 1.5 mole, preferably 0.2 to 1.0 mole, per 1 mole of the aromatic vinyl monomer, in view of the excellent strength and refractive index of the desired resin. When the amount of the maleimide monomers is over 1.5 mole, the monomer mixture does not occasionally become a homogeneous liquid at room temperature and gives undesirable brittle resin. On the other hand, when the amount of the maleimide monomers is less than 0.1 mole, the polymerization reaction proceeds undesirably with low speed.

The polyfunctional monomer is effective for enhancing the strength of the resin and includes monomers having two or more radically polymerizable vinyl or vinylidene groups within the molecule.

Suitable, examples of the polyfunctional monomer are phthalic acid (meth)arcyloyloxyalkyl derivatives (e.g. bis(2-methacryloyloxyethyl) phthalate, bis(2-methacryloyloxyethyl) tetrabromophthalate, etc.), aliphatic polyol (meth)acrylate derivatives (e.g. neopentylglycol dimethacrylate, hexanediol dimethacrylate, glycerol dimethacrylate, trimethylolpropane triacrylate, pentaerythritol tetraacrylate, etc.), (meth)acrylate derivatives having α(poly)ethylene glycol chain (e.g. ethylene glycol dimethacrylate, tetraethylene glycol dimethacrylate, nonaethylene glycol dimethac,rylate, nonaethylene glycol diacrylate, etc.), bisphenol A (meth)acrylate derivatives (e.g. 2,2-bis(4-methacryloyloxyphenyl)propane, 2,2-bis(4-acryloyloxyphenyl)propane, 2,2-bis[4-(2-methacryloyloxyethoxy)-phenyl]propane, 2,2-bis[4-(3-methacryloyloxy-2-hydroxypropyloxy)phenyl]propane, 2,2-bis[3,5-dibromo-4-(2-methacryloyloxyethoxy)phenyl]propane, etc.), isocyanuric acid - tris(2-hydroxyethyl methacylate), and the like. Among these, the compound having at least one hydroxyl group in the molecule, such as glycerol dimethacrylate or 2,2-bis[4-(3-methacryloyloxy-2-hydroxypropyloxy)phenyl]propane, are preferable because they are more effective on the enhancement of the strength of the resin.

The polyfunctional monomers are used in an amount of 1 to 30% by weight, preferably 5 to 20% by weight, based on the weight of the whole monomer mixture. When the amount of the polyfunctional monomers is less than 1% by weight or over 30% by weight, the desired effect for enhancing the strength of the resin is undesirably inferior.

In addition to the aromatic vinyl monomer, maleimide monomer and polyfunctional monomer, there can also be incorporated a copolymerizable, radical polymerizable monomer.

The copolymerizable, radical polymerizable monomer includes, for example, methacrylates (e.g. methyl methacrylate, ethyl methacrylate, benzyl methacrylate, phenyl, methacrylate, cyclohexyl methacrylate, bornyl methacrylate, dicyclopentanyl methacrylate, 2,3-dibromopropyl methacrylate, monobromophenyl methacrylate, dibromophenyl methacrylate, tribromophenyl methacrylate, etc.), acrylates (e.g. methyl acrylate, ethyl acrylate, n-butyl acrylate, etc.), unsaturated acids (e.g. methacrylic acid, acrylic acid, etc.), unsaturated acid anhydrides (e.g. maleic anhydride, citraconic anhydride, etc.), and the like.

The radical polymerization initiator includes known various initiators. Suitable examples are azo polymerization initiators (e.g. azobisisobutyronitrile, azobiscyclohexanecarbonitrile, etc.), peroxide polymerization initiators (e.g. lauroyl peroxide, benzoyl peroxide, dicumyl peroxide, di-t-butyl peroxide, t-butyl peroxybenzoate, t-butyl hydroperoxide, methyl ethyl ketone peroxide, etc.), and the like.

In the process of the invention, even when each of the above radical polymerization initiators is used alone, the polymerization proceeds, fairly rapidly, but in order to allow the polymerization to proceed more rapidly, it is preferable to use a redox polymerization initiator which consists of a combination of the above peroxide polymerization initiator with a reducing compound, or a known peroxide/metallic ion polymerization initiator which consists of a combination of the above peroxide polymerization initiator with a metallic ion which is effective as a polymerization promoter. Particularly, redox polymerization initiator is preferable.

The reducing compound used in combination of the peroxide polymerization initiator for the redox initiator includes compounds which dissolve in the monomer mixture, for example, tertiary amines (e.g. N,N-dimethylaniline, N,N-dimethyl-p-toluidine, etc.), aldehydes (e.g. formaldehyde, acetaldehyde, etc.), trivalent phosphur compounds such as phosphites (e.g. trimethylphosphite, triethylphosphite, etc.), sulfinic acid or derivatives thereof (e.g. p-toluenesulfinic acid, p-toluenesulfinic acid esters, etc.), thioureas (e.g. tetramethylthiourea, dibutylthiourea, etc.), mercaptans (e.g. laurylmercaptan, t-dodecylmercaptan, 2-ethylhexyl thioglycolate, octylmercaptan, n-butylmercaptan, pentaerythritol tetrathioglycolate, glycol dimercaptoacetate, glycol dimercaptopropionate, trimethylolpropane trismercaptopropionate, 2-mercaptoethanol and its esters, $\beta$-mercaptopropionic acid and its esters, etc.), and the like.

The peroxide polymerization initiator and the reducing compound are used in a ratio of 0.05 to 5 equivalents of the reducing material to 1 equivalent of the peroxide initiator wherein the equivalent means oxidation-reduction equivalent. When the ratio is less than 0.05 or more than 5, the desired rapid occurrence of radical becomes disadvantageously less effective.

In addition to the reducing compound, there may be used other conventional polymerization promoting agents such as amines, amine hydrohalides, quaternary ammonium halides, metal-containing compounds, and the like. These agents are used for promoting more the polymerization reaction.

The radical polymerization initiator is usually used in an amount of 0.001 to 5% by weight, preferably 0.01 to 2% by weight, based on the weight of the whole monomer mixture.

In the process of this invention, there may also be used any other conventional materials for improving the properties of the resin formed article having high refractive index, such as conventional ultraviolet absorbents, antioxidants, and the like. Moreover, in order to prevent undesirable rough surface of the formed article due to releasing from the mold during the cast polymerization, there may be used a conventional release-preventing agent.

The cast polymerization in this invention can be carried out by using a mold made of glass, metal, and any other materials and having various shapes such as platelike, lens-like, cylindrical, spherical shapes, which are designed depending on the utilities. The polymerization is carried out by pouring the starting mixture comprising the monomer mixture and a radical polymerization initiator into the mold and subjecting the polymerization reaction optionally to heating and/or pressure, by which the formed article of the polymer is directly produced. In the process, when the radical polymerization initiator is added, the polymerization reaction starts. Accordingly, when the radical polymerization initiator is mixed with the monomers, the mixture should be poured into the mold as soon as possible.

The method for mixing and pouring is usually carried out in the following manner.

When a redox initiator is used as the radical polymerization initiator, the redox polymerization initiator may be added to the monomer mixture, but it is preferable that the monomer mixture is divided into two parts, and a peroxide is mixed with one part of the monomer mixture and a reducing compound is mixed with other part of the monomer mixture, oralternatively, a peroxide is mixed with any one or more of the monomers and a reducing compound is mixed with the remaining monomer(s), and immediately before pouring into the mold, both mixtures are mixed.

In the mixing of the monomers, when the maleimide monomer is added to the aromatic vinyl monomer, the polymerizability is enhanced. Particularly, when both monomers are used in approximately equimolar amount, the polymerizability is significantly enhanced, and hence, in such a case, each monomer is kept separately, and the polymerization initiator is added to either one or both of the monomers, and immediately before pouring into the mold, both are mixed.

The above mixing procedure is preferably carried out at a temperature of 50° C. or lower within a short period of time such as within 10 minutes. When the mixing is carried out at a temperature of higher than 50° C., the polymerization reaction proceeds undesirably partly during mixing procedure. Besides, when the mixing procedure is carried out in a longer period of time, the polymerization reaction proceeds undesirably during the mixing procedure, too. Thus, if the mixing is well effected, the mixing time should be as short as possible.

The mixing procedure can be done by batch system for producing of a small amount of small formed articles, but is preferably carried out by continuous system for producing large formed articles or a large amount of formed articles with a plenty of molds. The continuous mixing can be carried out by a conventional mixing method using an impigment type mixer, dynamic mixer, static mixer, etc.

The cast polymerization may be carried out at room temperature but is preferably carried out at a temperature of 50° to 150° C. The polymerization reaction may proceed by charging the materials to be polymerized into a mold and heating at a fixed temperature, or may be carried out by charging the materials to be polymerized into a mold which is previously heated at a fixed temperature. Besides, the polymerization reaction may be carried out under atmospheric pressure, but is optionally carried out under pressure in order to prevent undesirable sink marks or voids due to polymerization shrinkage or undesirable foams due to exothermic polymerization heat.

The formed articles of this invention are useful for producing various optical elements, particularly optical elements having a large refractive index, such as various lenses (e.g. lens for glasses, lens for camera, pickup lens, Fresnel lens, etc.), and various prisms.

The invention is illustrated by the following Examples and Reference Examples but should not be construed to be limited thereto.

In the Examples and Reference Examples, various properties were measured by the following methods.

(1) Birefringence ($n_D$) and Abbe number ($\nu_D$):

These were measured with Abbe refractometer (manufactured by Shimadzu Seisakusho, Japan) at 25° C., wherein monobromonaphthalene was used as a contacting liquid.

(2) Total light transmittance (Tt):

It was measured according to ASTM D-1003 by using an integrating sphere type haze meter (type SEP-H-2D, manufactured by Nippon Seimitsu Kogaku K.K., Japan).

(3) Flexural strength:

It was measured according to ASTM D-790 by using an autograph (manufactured by Shimadzu Seisakusho, Japan).

(4) Specific gravity:

It was measured by placing the test sample in water in accordance with JIS K-6911.

(5), Birefringence:

The molded article was put between two polarizing films which were set so that the polarized light direction is in crosswise direction. The data were evaluated as follows.

Bad: article appeared wholly whighty bright owing to birefringence.

No Good: article appeared partly whighty bright.

Good: article appeared almost not whighty bright.

EXAMPLE 1

A stainless vessel (2 liter volume) was charged with styrene (630 g), N-cyclohexylmaleimide (270 g), 2,2-bis[4-(3-methacryloyloxy-2-hydroxypropyloxy)-phenyl]propane (100 g), t-butyl peroxybenzoate (20 g), and dimethyloctylamine hydrochloride (1.2 g) to give a homogeneous starting liquid (X).

Other stainless vessel was charged with styrene (630 g), N-cyclohexylmaleimide (270 g), 2,2-bis[4-(3-methacroyloxy-2-hydroxypropyloxy)phenyl]propane (100 g), glycol dimercaptoacetate (12 g), and copper naphthenate (copper content: 10% by weight, 0.008 g) to give a homogeneous starting liquid (Y).

The starting liquid (X) (about 250 g) and the starting liquid (Y) (about 250 g) were charged into a dynamic mixer with a pump and mixed therein in a mean retention time of 30 seconds and then the resulting mixture was poured into a stainless frame (350×350×3 mm) which was kept at 85° C.

Two minutes after completion of the pouring, the temperature within the frame became maximum. After the temperature lowered to 85° C., the formed product was released from the frame. The formed product thus obtained showed light transmittance (Tt): 86%, birefringence ($n_D$) 1.567, Abbe number ($\nu_D$) 34, flexural strength: 870 kg/cm², specific gravity: 1.12, and showed good birefringence and good surface state.

EXAMPLES 2 TO 13 AND REFERENCE EXAMPLES 1 TO 3

In the same manner as described in Example 1 except that the components as shown in Table 1 were used, the polymerization reaction was carried out. The results are shown in Table 2.

EXAMPLE 14

A stainless vessel (200 ml volume) was charged with styrene (63 g), N-cyclohexylmaleimide (27 g), and 2,2-bis[4-(3-methacryloyloxy-2-hydroxypropyloxy)-phenyl]propane (10 g) to give a homogeneous liquid. To the liquid was added azobisisobutyronitrile (0.15 g) to give a homogeneous starting liquid.

The starting liquid was poured into a stainless frame (160×160×3 mm) which was kept at 85° C. and then subjected to polymerization reaction at 85° C. on a warmed bath.

About 9 minutes after initiation of the polymerization reaction, the temperature within the frame became maximum. After the temperature lowered to 85° C., the formed product was released from the frame. The formed product thus obtained showed light transmittance (Tt): 90%, birefringence ($n_D$) 1.573, Abbe number ($\nu_D$) 34, flexural strength: 810 kg/cm², specific gravity: 1.11, and showed good birefringence and good surface state.

EXAMPLE 15 AND REFERENCE EXAMPLE 4

In the same manner as described in Example 14 except that the components as shown in Table 1 were used, the polymerization reaction was carried out. The results are shown in Table 2.

TABLE 1

| Ex. No. | Monomer (a) (wt. %) | Monomer (b) (wt. %) | Molar ratio of (b)/(a) | Monomer (c) (wt. %) | Monomer (d) (wt. %) | Initiator |
|---|---|---|---|---|---|---|
| Ex. 2 | St (63) | CHMI (27) | 0.25 | GMR (10) | — | $A_1$ |
| Ex. 3 | ClSt (68) | CHMI (22) | 0.25 | BisG (10) | — | $A_1$ |
| Ex. 4 | St (38) | CHMI (32) | 0.50 | BisG (10) | MMA (20) | $A_2$ |
| Ex. 5 | St (31) | CHMI (39) | 0.75 | BisG (10) | MMA (20) | $A_3$ |
| Ex. 6 | St (63) | CHMI (27) | 0.25 | HD (10) | — | $A_1$ |
| Ex. 7 | St (63) | CHMI (27) | 0.25 | NGP (10) | — | $A_1$ |
| Ex. 8 | St (63) | CHMI (27) | 0.25 | 4G (10) | — | $A_1$ |
| Ex. 9 | St (56) | CHMI (24) | 0.25 | 9G (20) | — | $A_2$ |
| Ex. 10 | ClSt (68) | CHMI (22) | 0.25 | 4G (10) | — | $A_2$ |
| Ex. 11 | St (60) | CPMI (30) | 0.25 | 4G (10) | — | $A_1$ |
| Ex. 12 | St (52) | EPMI (38) | 0.25 | 4G (10) | — | $A_1$ |
| Ex. 13 | St (38) | CHMI (32) | 0.50 | 4G (10) | MMA (20) | $A_3$ |
| Ex. 15 | St (63) | CHMI (27) | 0.25 | 4G (10) | — | B |
| Ref. Ex. 1 | St (70) | CHMI (30) | 0.25 | — | — | $A_2$ |
| Ref. Ex. 2 | St (70) | — | — | BisG (30) | — | $A_1$ |
| Ref. Ex. 3 | St (70) | — | — | 4G (30) | — | $A_1$ |
| Ref. Ex. 4 | St (70) | CHMI (30) | 0.25 | — | — | B |

TABLE 2

| Ex. No. | Peak time (minute) | Tt (%) | $n_D$ (—) | $\nu_D$ (—) | Flexural strength (kg/cm²) | Specific gravity (—) | Birefringence |
|---|---|---|---|---|---|---|---|
| Ex. 2 | 1.8 | 90 | 1.571 | 36 | 910 | 1.12 | Good |
| Ex. 3 | 4.1 | 86 | 1.583 | 32 | 850 | 1.23 | Good |
| Ex. 4 | 3.8 | 86 | 1.552 | 38 | 790 | 1.15 | Good |
| Ex. 5 | 4.1 | 89 | 1.549 | 39 | 770 | 1.16 | Good |
| Ex. 6 | 1.5 | 90 | 1.568 | 34 | 430 | 1.11 | Good |
| Ex. 7 | 1.1 | 90 | 1.568 | 34 | 430 | 1.11 | Good |
| Ex. 8 | 0.8 | 90 | 1.570 | 32 | 340 | 1.11 | Good |
| Ex. 9 | 1.5 | 90 | 1.559 | 39 | 500 | 1.11 | Good |
| Ex. 10 | 1.5 | 89 | 1.578 | 32 | 710 | 1.24 | Good |
| Ex. 11 | 0.8 | 89 | 1.588 | 32 | 490 | 1.17 | Good |
| Ex. 12 | 0.8 | 90 | 1.577 | 34 | 470 | 1.12 | Good |
| Ex. 13 | 1.5 | 92 | 1.549 | 40 | 800 | 1.15 | Good |
| Ex. 15 | 15 | 91 | 1.569 | 34 | 570 | 1.11 | Good |
| Ref. Ex. 1 | 0.4 | Many cracks and could not be measured ||||||
| Ref. Ex. 2 | 26 | 90 | 1.583 | 31 | 970 | 1.10 | Good |
| Ref. Ex. 3 | 51 | 90 | 1.579 | 34 | 950 | 1.12 | Good |
| Ref. Ex. 4 | No | Many cracks and could not be measured ||||||

[Note in Table 1]
The abbreviations in Table 1 are defined as follows:
St: Styrene
ClSt: p-Chlorostyrene
EPMI: N-(2,6-Diethylphenyl)maleimide
CHMI: N-Cyclohexylmaleimide
CPMI: N-(2-Chlorophenyl)maleimide TABLE 2-continued

| Ex. No. | Peak time (minute) | Tt (%) | $n_D$ (—) | $v_D$ (—) | Flexural strength (kg/cm²) | Specific gravity (—) | Birefringence |
|---|---|---|---|---|---|---|---|

4G: Tetraethylene glycol dimethacrylate
9G: Nonaethylene glycol dimethacrylate
BisG: 2,2-Bis[4-(3-methacryloyloxy-2-hydroxy-propyloxy)phenyl]propane
GMR: Glycelol dimethacrylate
HD: Hexanediol dimethacrylate
NGP: Neopentyl glycol dimethacrylate
MMA: Methyl methacrylate

| Initiators: | $A_1$ | $A_2$ | $A_3$ |
|---|---|---|---|
| t-Butyl peroxybenzoate | 1.0 | 0.6 | 0.3 |
| Glycol dimercaptoacetate | 0.6 | 0.36 | 0.18 |
| Dimethyloctylamine HCl | 0.06 | 0.06 | 0.06 |
| Copper naphthenate | 0.0004 | 0.0004 | 0.0004 |

(The numerals mean part by weight per 100 parts by weight of the whole monomers)
Initiator B: Azobisisobutyronitrile 0.15

The peak time in Table 2 means the time period from the pouring of the starting liquid into the frame until the maximum temperature within the frame is reached.

According to this invention, the desired formed article having a high strength can be produced from an aromatic vinyl resin having a high refractive index rapidly and with high productivity. The thus produced formed article of a resin having a high refractive index has a specific gravity of about 1.10 to 1.25 and hence is lighter than glass (specific gravity: about 2.5), and further, the formed article has low birefringence. Accordingly, the formed article of this invention has excellent properties suitable for producing various optical elements such as lenses, prisms, etc.

What is claimed is:

1. A process of producing optical elements from an aromatic vinyl resin, which comprises copolymerizing an aromatic vinyl monomer, a maleimide monomer in an amount of 0.1 to 1.5 mole per 1 mole of the aromatic vinyl monomer, and a polyfunctional monomer which is a member selected from the group consisting of phthalic acid (meth)acryloyloxyalkyl ester derivatives, aliphatic polyol (meth)acrylate derivatives, (meth)acrylate derivatives having a (poly)ethylene glycol chain, bisphenol A (meth)acrylate derivatives, and iscyanuric acid-tris(2-hydroxyethyl methacrylate) in an amount of 1 to 30% by weight based on the weight of the whole monomer mixture in the presence of a radical polymerization initiator by a cast polymerization process.

2. The process according to claim 1, wherein the aromatic vinyl monomer is polymerized in an amount of 35 to 95% by weight based on the height of the whole monomer mixture.

3. The process according to claim 1, wherein the aromatic vinyl monomer is a member selected from the group consisting of styrenes, polycyclic hydrocarbon aromatic vinyl compounds and heterocyclic vinyl compounds, and the maleimide monomer is a member selected from the group consisting of maleimide, aliphatic monomaleimides, alicyclic monomaleimides, aromatic monomaleimides, bismaleimimes having no aromatic ring, and aromatic ring bismaleimides.

4. The process according to claim 1, wherein the aromatic vinyl monomer is a styrene compound, the maleimide monomer is a member selected from the group consisting of aromatic monomalides and alicyclic monomaleimides, and the polyfunctional monomer is a member selected from the group consisting of glycerol dimethacrylate and 2,2-bis{4-(3-methacryloyloxy-2-hydroxypropyloxy)phenyl}propane.

5. The process according to claim 1, wherein the radical polymerization initiator is used in an amount of 0.001 to 5% by weight based on the weight of the whole monomer mixture.

6. The process according to claim 1, wherein the cast polymerization is carried out by pouring the starting monomer mixture and radical polymerization initiator into a mold and subjecting the polymerization reaction optionally to heating and/or pressure.

7. The process according to claim 6, wherein the monomers to be copolymerized and polymerization initiator are mixed before pouring into the mold.

8. The process according to claim 7, wherein the radical polymerization initiator is a redox polymerization initiator consisting of a peroxide polymerization initiator and a reducing compound.

9. The process according to claim 8, wherein the peroxide initiator is mixed with one part of the monomer mixture and the reducing compound is mixed with other part of the monomer mixture and both mixtures are mixed immediately before pouring into the mold.

10. The process according to claim 8, wherein the peroxide initiator is mixed with any one or more of the monomers and the reducing compound is mixed with the remaining monomer, and both mixtures are mixed immediately before pouring into the mold.

11. The process according to claim 6, wherein the cast polymerization reaction is carried out at a temperature of 50° to 150° C. and optionally under pressure.

12. The process according to claim 3, wherein the aromatic vinyl monomer is a member selected from the group consisting of styrene, alpha-methylstyrene, o-methylstyrene, m-methylstyrene, p-methylstyrene, monomethyoxystyrene, monochlorostyrene, dichlorostyrene, tribromostyrene, iodostyrene, p-(trimethylsilyloxy)styrene, vinylnaphthalene, vinylanthracene, N-vinylcarbazole, vinylfuran and vinylpyridine.

13. The process according to claim 12, wherein the aromatic vinyl monomer is a member selected from the group consisting of styrene, alpha-methylstyrene, o-methylsytrene, m-methylstyrene monochlorosytrene, dichlorostyrene, tribromostyrene, iodostyrene and p-(trimethylsilyloxy)styrene.

14. The process according to claim 3, wherein the maleimide monomer is a member selected from the group consisting of N-methylmaleimide, N-ethylmaleimide, N-isopropylmaleimide, N-butylmaleimide, N-laurylmaleimide, N-cyclohexylmaleimide, N-cyclopentylmaleimide, N-phenylmaleimide, N-(2-methylphenyl)maleimide, N-(4-methylphenyl)maleimide, N-

(2-chloropentyl)maleimide N-(2-methoxyphenyl) maleimide, N-xylymaleimide, N-(2,4,6-trichlorophenyl)-maleimide, N,N'-sulfonbismaleimide, N,N'-etherbismaleimide, m-tolylenebismaleimide, N,N'-m-phenylenebismaleimide and N,N'-diphenylmethanebismalemide.

15. The process according to claim 14, wherein the maleimide monomer is a member selected from the group consisting of N-(2-chlorphenyl)maleimide, N-(2-methoxyphenyl)maleimide, N-cyclohexylmaleimide and N-cyclopentylmaleimide.

16. The process according to claim 3, wherein the polyfunctional monomer is a member selected from the group consisting of bis(2-methacryloyloxyethyl) phthalate, bis(2-methacryloyloxyethyl) tetrabromohthalate, neopentylglycol dimethacrylate, hexanediol dimethacrylate, glycerol dimethacrylate, trimethylolpropane triacrylate, pentaerythritol tetraacrylate, ethylglycol dimethacrylate, tetraethylene glycol dimethacrylate, nonaethylene glycol dimethacrylate, nonaethylene glycol diacrylate, 2,2-bis(4-methacryloyloxyphenyl)propane, 2,2-bis(4-acryloyloxyphenyl)propane, 2,2-bis{4-(2-methacryloyloxyethoxy)phenyl}propane, 2,2-bis{4-(3-methacryloyloxy-2-hydroxyproploxy)-phenyl}propane, 2,2-bis{3,5-dibromo-4-(2-methacryloyloxyethoxy)phenyl}propane and isocyanuric acid-tris(2-hydroxyethyl methacrylate.

17. The process according to claim 16, wherein the polyfunctional monomer is a member selected from the group consisting of glycel dimethacrylate and 2,2-bis{4-(3-methacryloyloxy-2-hydroxypropyloxy)phenyl}propane.

18. The process according to claim 1, wherein said polyfunctional monomer is used in an amount of from 5 to 20% based on the weight of the whole monomer mixture.

19. The process according to claim 8, wherein the peroxide polymerization initiator and the reducing compound are used in an amount ratio of from 0.05 to 5 equivalents of the reducing material to 1 equivalent of the peroxide initiator.

20. The process according to claim 5, wherein the radical polymerization initiator is used in an amount of 0.01 to 2% by weight based on the weight of the whole monomer mixture.

21. The process according to claim 2, wherein the aromatic vinyl monomer is polymerized in an amount of 45 to 90% by weight based on the weight of the whole monomer mixture.

* * * * *